(12) United States Patent
Govari et al.

(10) Patent No.: US 12,551,269 B2
(45) Date of Patent: Feb. 17, 2026

(54) DISPLAYING INDICATIONS OF MUTUAL DISTANCES AMONG ELECTRODES OF A FLEXIBLE ABLATION CATHETER

(71) Applicant: Biosense Webster (Israel) Ltd., Yokneam (IL)

(72) Inventors: Assaf Govari, Haifa (IL); Andres Claudio Altmann, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 200 days.

(21) Appl. No.: 17/461,813

(22) Filed: Aug. 30, 2021

(65) Prior Publication Data

US 2022/0096150 A1 Mar. 31, 2022

Related U.S. Application Data

(60) Provisional application No. 63/084,475, filed on Sep. 28, 2020.

(51) Int. Cl.
*A61B 18/14* (2006.01)
*A61B 90/92* (2016.01)
*A61B 18/00* (2006.01)

(52) U.S. Cl.
CPC .......... *A61B 18/1492* (2013.01); *A61B 90/92* (2016.02); *A61B 2018/00351* (2013.01);
(Continued)

(58) Field of Classification Search
CPC ................ A61B 18/1492; A61B 90/92; A61B 2018/00351; A61B 2018/00577;
(Continued)

(56) References Cited

U.S. PATENT DOCUMENTS

| 5,391,199 A | 2/1995 | Ben-Haim |
| 6,239,724 B1 | 5/2001 | Doron et al. |

(Continued)

FOREIGN PATENT DOCUMENTS

| JP | 2015226777 A | 12/2015 |
| JP | 2019103809 A | 6/2019 |

(Continued)

OTHER PUBLICATIONS

Extended European Search Report dated Feb. 22, 2022, from corresponding European Application No. 21199196.3.
(Continued)

*Primary Examiner* — Joanne M Rodden
*Assistant Examiner* — Abigail M Ziegler

(57) ABSTRACT

A system includes: (i) a processor, configured to receive position signals indicative of a first position of a first electrode coupled to a catheter, and a second position of a second electrode coupled to the catheter; calculate, based on the position signals, a distance between the first and second electrodes; and produce a first indication, in response to finding that the calculated distance is larger than a first threshold, a second indication, in response to finding that the calculated distance is smaller than the first threshold and larger than a second threshold, and a third indication, in response to finding that the calculated distance is smaller than the second threshold, and (ii) a display, configured to present a first symbol, in response to receiving the first indication, a second symbol, in response to receiving the second indication, and a third symbol, in response to receiving the third indication.

13 Claims, 2 Drawing Sheets

(52) U.S. Cl.
CPC ............... *A61B 2018/00577* (2013.01); *A61B 2018/1467* (2013.01)

(58) Field of Classification Search
CPC .. A61B 2018/1467; A61B 2018/00357; A61B 2018/00875; A61B 2018/00898; A61B 2018/1407; A61B 2018/00666
See application file for complete search history.

(56) References Cited

U.S. PATENT DOCUMENTS

| | | |
|---|---|---|
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 7,536,218 B2 | 5/2009 | Govari et al. |
| 7,756,576 B2 | 7/2010 | Levin |
| 7,848,787 B2 | 12/2010 | Osadchy |
| 7,869,865 B2 | 1/2011 | Govari et al. |
| 8,456,182 B2 | 6/2013 | Bar-Tal et al. |
| 2002/0065455 A1 | 5/2002 | Ben-Haim et al. |
| 2003/0120150 A1 | 6/2003 | Govari |
| 2004/0068178 A1 | 4/2004 | Govari |
| 2006/0009754 A1 | 1/2006 | Boese et al. |
| 2010/0249771 A1 | 9/2010 | Person et al. |
| 2011/0118727 A1* | 5/2011 | Fish .................... A61B 5/01 606/34 |
| 2012/0158011 A1* | 6/2012 | Sandhu .................. A61B 34/30 606/130 |
| 2012/0211542 A1* | 8/2012 | Racenet ........... A61B 17/07207 227/175.1 |
| 2013/0085448 A1* | 4/2013 | Ter-Ovanesyan ...... A61B 90/06 604/113 |
| 2015/0196216 A1 | 7/2015 | Laughner et al. |
| 2015/0374427 A1 | 12/2015 | Goertzen et al. |
| 2018/0360533 A1 | 12/2018 | Olson |
| 2018/0368905 A1* | 12/2018 | Latterell .............. A61B 18/042 |
| 2019/0175265 A1 | 6/2019 | Govari et al. |
| 2019/0307500 A1* | 10/2019 | Byrd ...................... A61B 34/20 |
| 2020/0237425 A1* | 7/2020 | Laughner ........... A61B 18/1492 |
| 2020/0297415 A1* | 9/2020 | Marshik ............... A61B 90/361 |
| 2021/0330213 A1* | 10/2021 | Papini .................. A61B 5/6852 |
| 2022/0226046 A1* | 7/2022 | Mariappan ......... A61B 18/1492 |
| 2022/0257938 A1* | 8/2022 | Stewart .................. A61N 1/303 |

FOREIGN PATENT DOCUMENTS

| | | |
|---|---|---|
| JP | 2019202139 A | 11/2019 |
| WO | 1996005768 A1 | 2/1996 |

OTHER PUBLICATIONS

Decision to Grant Patent with English translation dated Feb. 10, 2025, from corresponding Japanse Application No. 2021-156445.

* cited by examiner

DISPLAYING INDICATIONS OF MUTUAL DISTANCES AMONG ELECTRODES OF A FLEXIBLE ABLATION CATHETER

CROSS-REFERENCE TO RELATED APPLICATIONS

This application claims the priority benefit of U.S. Provisional Patent Application 63/084,475, filed Sep. 28, 2020, whose disclosure is incorporated herein by reference.

FIELD OF THE INVENTION

The present invention relates generally to medical devices, and particularly to methods and systems for displaying indications of mutual distances among electrodes of flexible ablation catheters.

BACKGROUND OF THE INVENTION

Systems for performing minimally invasive medical procedures may include a catheter with several electrodes and a device for displaying the location of the electrodes in the body.

For example, U.S. Patent Application Publication 2010/0249771 describes a system and method for interactively planning and controlling a treatment of a patient for a medical treatment device. The system includes a memory, a processor coupled to the memory, and a treatment control module stored in the memory and executable by the processor. The treatment control module graphically displays in real time a continuously changing treatment region defined by the electrodes as a user moves at least one of the electrodes. This allows the user to more effectively plan and treat a target region.

U.S. Patent Application Publication 2015/0196216 describes a medical device that may include a catheter shaft with a plurality of electrodes coupled thereto and a processor coupled to the catheter shaft. The processor may be capable of collecting a set of signals from the plurality of electrodes, generating a set of data from at least one of the set of signals, wherein the data set includes at least one known data point and one or more unknown data points, determining a non-linear distance between the at least one known data point and the one or more unknown data points, and assigning a value to at least one of the unknown data points.

SUMMARY OF THE INVENTION

An embodiment of the present invention that is described herein provides a system including a processor and a display. The processor is configured to: (a) receive one or more position signals indicative of (i) a first position of a first electrode coupled to a catheter inserted into an organ of a patient and (ii) a second position of a second electrode coupled to the catheter, (b) calculate, based on the position signals, a distance between the first and second electrodes, and (c) produce: (i) a first indication, in response to finding that the calculated distance is larger than a first threshold, (ii) a second indication, in response to finding that the calculated distance is smaller than the first threshold and larger than a second threshold, and (iii) a third indication, in response to finding that the calculated distance is smaller than the second threshold. The display is configured to present: (i) a first symbol, in response to receiving the first indication, (ii) a second symbol, in response to receiving the second indication, and (iii) a third symbol, in response to receiving the third indication.

In some embodiments, the display is configured to graphically present a traffic light, (i) the first symbol includes a first color displayed at a first location of the traffic light, (ii) the second symbol includes a second color displayed at a second location of the traffic light, and (iii) the third symbol includes a third color displayed at a third location of the traffic light. In other embodiments, the organ includes a heart of the patient and the catheter includes a lasso-type catheter, and the first and second electrodes include ablation electrodes configured to apply one or more ablation pulses to tissue of the heart.

In an embodiment, when the calculated distance between the first and second electrodes is smaller than the first threshold, the processor is configured to produce a message indicative of whether a user can apply the one or more ablation pulses to the tissue. In another embodiment, when the calculated distance between the first and second electrodes is smaller than the second threshold, the processor is configured to prevent a user from applying the one or more ablation pulses to the tissue.

There is additionally provided, in accordance with an embodiment of the present invention, a method, including receiving one or more position signals indicative of (i) a first position of a first electrode coupled to a catheter inserted into an organ of a patient and (ii) a second position of a second electrode coupled to the catheter. Based on the position signals, a distance between the first and second electrodes is calculated. The following indications are produced: (i) a first indication, in response to finding that the calculated distance is larger than a first threshold, (ii) a second indication, in response to finding that the calculated distance is smaller than the first threshold and larger than a second threshold, and (iii) a third indication, in response to finding that the calculated distance is smaller than the second threshold. The following symbols are presented: (i) a first symbol, in response to receiving the first indication, (ii) a second symbol, in response to receiving the second indication, and (iii) a third symbol, in response to receiving the third indication.

There is further provided, in accordance with an embodiment of the present invention, a system including a processor and a display. The processor is configured to; (a) receive one or more impedance signals indicative of an impedance measured between at least first and second electrodes coupled to a catheter inserted into an organ of a patient, (b) estimate, based on the one or more impedance signals, a distance between the first and second electrodes, and (c) produce: (i) a first indication, in response to finding that the estimated distance is larger than a first threshold, (ii) a second indication, in response to finding that the estimated distance is smaller than the first threshold and larger than a second threshold, and (iii) a third indication, in response to finding that the estimated distance is smaller than the second threshold. The display is configured to present: (i) a first symbol, in response to receiving the first indication, (ii) a second symbol, in response to receiving the second indication, and (iii) a third symbol, in response to receiving the third indication.

In some embodiments, the organ includes a heart of the patient and the catheter includes a lasso-type catheter, and the first and second electrodes include ablation electrodes configured to apply one or more ablation pulses to tissue of the heart. In other embodiments, when the estimated distance between the first and second electrodes is smaller than the first threshold, the processor is configured to produce a message indicative of whether a user can apply the one or more ablation pulses to the tissue. In yet other embodiments, when the estimated distance between the first and second electrodes is smaller than the second threshold, the processor is configured to prevent a user from applying the one or more ablation pulses to the tissue.

The present invention will be more fully understood from the following detailed description of the embodiments thereof, taken together with the drawings in which:

DETAILED DESCRIPTION OF EMBODIMENTS

Overview

Flexible ablation catheters, such as lasso catheters, may comprise multiple ablation electrodes. During an ablation procedure, the flexible catheter may be undesirably folded so that two or more of the electrodes may not have sufficient distance therebetween, which may result in undesired outcome of the ablation procedure.

Embodiments of the present invention that are described hereinafter provide improved techniques for presenting symbols indicative of distances between electrodes of a flexible catheter, and alerting on insufficient distance between two or more of the electrodes.

In some embodiments, an ablation system comprises a flexible catheter, such as a lasso-type catheter, having multiple ablation electrodes and configured to be inserted into a patient organ for ablating tissue.

In some embodiments, the ablation system comprises a processor, which is configured to receive one or more position signals indicative of first and second positions of first and second corresponding electrodes of the catheter. The processor is configured to calculate, based on the position signals, a distance between the first and second electrodes.

In some embodiments, the processor is configured to produce (i) a first indication, in response to finding that the calculated distance is larger than a first threshold, (ii) a second indication, in response to finding that the calculated distance is smaller than the first threshold and larger than a second threshold, and (iii) a third indication, in response to finding that the calculated distance is smaller than the second threshold.

In some embodiments, the ablation system comprises a display, which is configured to present: (i) a first symbol, in response to receiving the first indication, (ii) a second symbol, in response to receiving the second indication, and (iii) a third symbol, in response to receiving the third indication. For example, the first and second thresholds may be indicative of 3 mm and 1 mm distance between the electrodes. In some embodiments, the display is configured to graphically present a traffic light, such that (i) the first symbol comprises a green color displayed at a first location of the traffic light, (ii) the second symbol comprises an amber color displayed at a second location of the traffic light, and (iii) the third symbol comprises a red color displayed at a third location of the traffic light.

In some embodiments, when the display presents red or amber light, a physician that performs the ablation may adjust the position of the electrodes, e.g., before applying the ablation pulses, so that the display presents a green light instead of a red or amber light.

The disclosed techniques improve the safety of patients undergoing ablation procedures and may improve the quality and shorten the cycle time of the ablation procedures.

System Description

Figure 1:
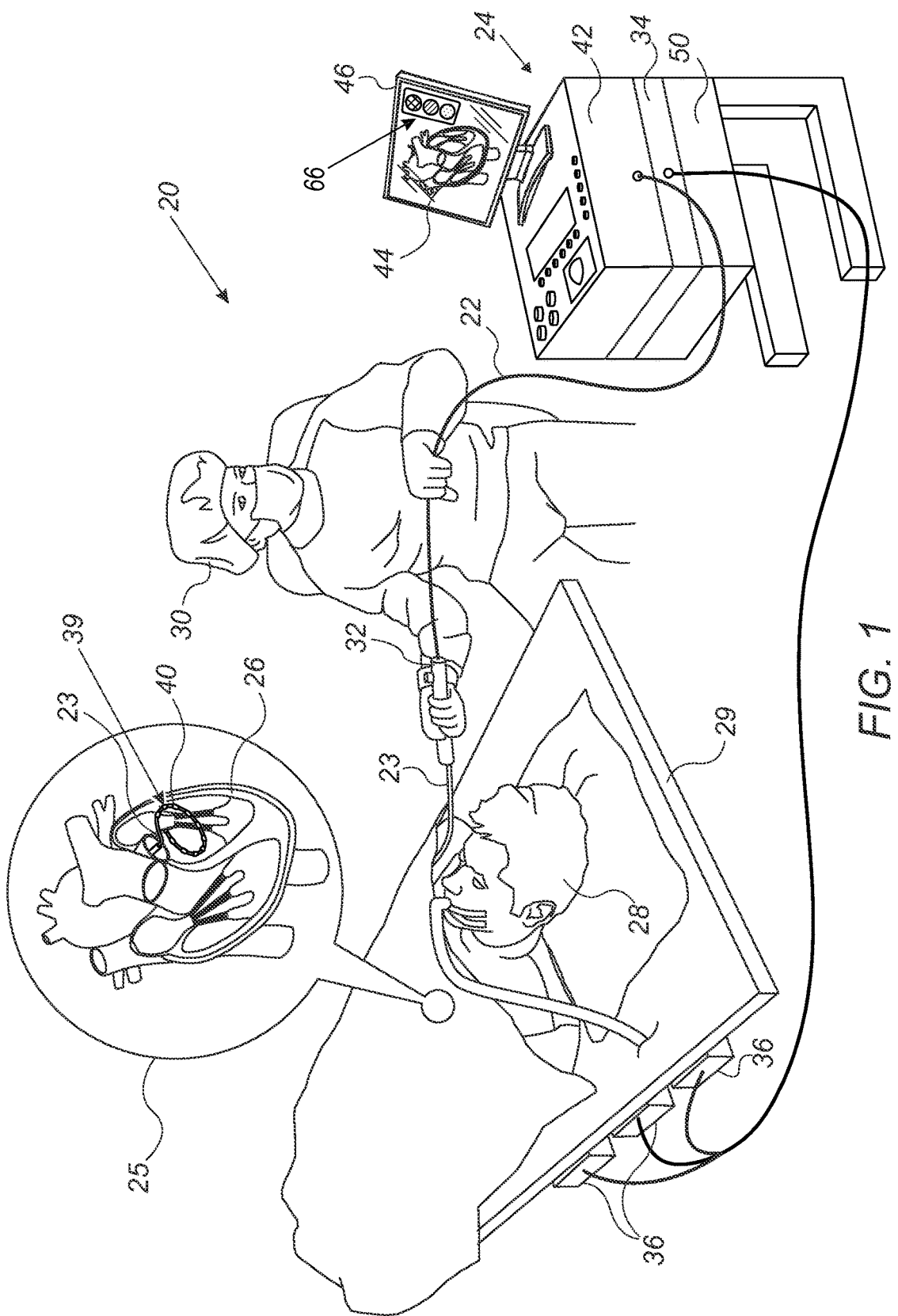
FIG. 1 is a schematic, pictorial illustration of a catheter-based position-tracking and ablation system, in accordance with an embodiment of the present invention.

FIG. 1 is a schematic, pictorial illustration of a catheter-based position-tracking and ablation system 20, in accordance with an embodiment of the present invention. In some embodiments, system 20 comprises a catheter 22, in the present example an expandable lasso-type cardiac catheter, and a control console 24. In the embodiment described herein, catheter 22 may be used for any suitable therapeutic and/or diagnostic purposes, such as ablation of tissue in a heart 26.

In some embodiments, console 24 comprises a processor 42, typically a general-purpose computer, with suitable front end and interface circuits for receiving signals from catheter 22 and for controlling other components of system 20 described herein. Processor 42 may be programmed in software to carry out the functions that are used by the system, and is configured to store data for the software in a memory 50. The software may be downloaded to console 24 in electronic form, over a network, for example, or it may be provided on non-transitory tangible media, such as optical, magnetic or electronic memory media. Alternatively, some or all of the functions of processor 42 may be carried out using an application-specific integrated circuit (ASIC) or any suitable type of programmable digital hardware components.

Reference is now made to an inset 25. In some embodiments, catheter 22 comprises a distal-end assembly or end-effector 40 having a lasso-shape (shown in detail in FIGS. 2 and 3 below), and a shaft 23 for inserting distal-end assembly 40 to a target location for ablating tissue in heart 26. During an ablation procedure, physician 30 inserts catheter 22 through the vasculature system of a patient 28 lying on a table 29. Physician 30 moves distal-end assembly 40 to the target location in heart 26 using a manipulator 32 near a proximal end of catheter 22, which is connected to interface circuitry of processor 42. It should be noted that this invention is not limited to the lasso-shape configuration in that other shapes such as planar array or the ray type end-effector are within the scope of the invention.

In some embodiments, catheter 22 comprises at least one position sensor 39 of a position tracking system, which is coupled to the distal end of catheter 22, e.g., in close proximity to distal-end assembly 40. In the present example, position sensor 39 comprises a magnetic position sensor, but in other embodiments, any other suitable type of position sensor (e.g., other than magnetic-based) may be used. For example, current based position sensing can be determined via current applied to electrodes and measuring the impedances between the electrodes inside the body with respect to patches outside the body such as described in inventor's U.S. Pat. No. 7,869,865 which is incorporated by reference herein (with a copy provided in the Appendix). Variations of impedance location sensing and magnetic location sensing technique, as well as combination of both magnetic and impedance location sensing techniques are also described in U.S. Pat. Nos. 7,536,218; 7,756,576; 7,848,787; 8,456,182, which are incorporated by reference herein. Catheter 22 may comprise multiple position sensors 39 disposed, for example, between electrodes of distal-end assembly 40.

Reference is now made back to the general view of FIG. 1. In some embodiments, during the navigation of distal-end assembly 40 in heart 26, processor 42 receives signals from magnetic position sensor 39 in response to magnetic fields from external field generators 36, for example, for the purpose of measuring the position of distal-end assembly 40 in heart 26. In some embodiments, console 24 comprises a driver circuit 34, configured to drive magnetic field generators 36. Magnetic field generators 36 are placed at known positions external to patient 28, e.g., below table 29.

In some embodiments, processor 42 is configured to display, e.g., on a display 46 of console 24, the tracked position of distal-end assembly 40 overlaid on an image 44 of heart 26.

The method of position sensing using external magnetic fields is implemented in various medical applications, for example, in the CARTO™ system, produced by Biosense Webster Inc. (Irvine, Calif.) and is described in detail in U.S. Pat. Nos. 5,391,199, 6,690,963, 6,484,118, 6,239,724, 6,618,612 and 6,332,089, in PCT Patent Publication WO 96/05768, and in U.S. Patent Application Publications 2002/0065455 A1, 2003/0120150 A1 and 2004/0068178 A1, whose disclosures are all incorporated herein by reference.

In some embodiments, processor 42 is configured to calculate, based on one or more position signals received from one or more position sensors 39, a distance (shown in FIGS. 2 and 3 below) between any electrode-pair of distal-end assembly 40.

In some embodiments, display 46 is configured to present one or more traffic-light icons (TLIs), such as a TLI 66, having symbols indicative of the calculated distance between two selected electrodes of distal-end assembly 40. The TLIs and symbols are described in detail in FIGS. 2 and 3 below.

In alternative embodiments, processor 42 is configured to receive one or more signals indicative of an impedance measured between at least a pair of selected electrodes of distal-end assembly 40. In the context of the present disclosure and in the claims, the term "impedance" refers to an electrical impedance typically measured between two selected electrodes as is well known in the art. Based on the measured impedance, processor 42 is configured to estimate the distance between the electrodes of the pair. Processor 42 is further configured to hold one or more impedance thresholds indicative of distance-thresholds between the selected electrodes. Subsequently, processor 42 is configured to present to a user one or more symbols indicative of whether the estimated distance exceeds at least one of the thresholds, as will be described in detail in FIGS. 2-4 below.

In other embodiments, system 20 may have one or more traffic light pillars (not shown) connected, for example, to console 24, or a combination of TLIs and pillars, or any other suitable techniques for presenting one or more of the aforementioned symbols to physician 30.

Displaying Symbols Indicative of Respective Inter-Electrode Distances

Figure 2:
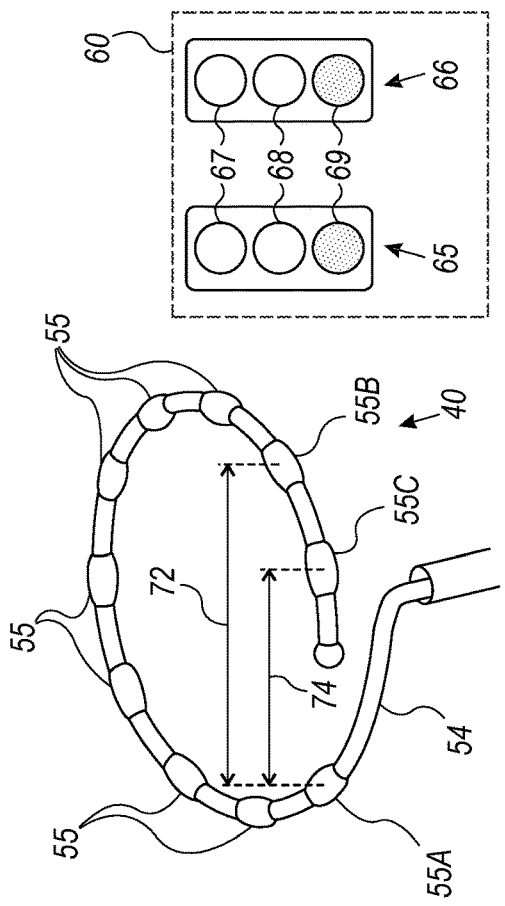
FIGS. 2 and 3 are schematic, pictorial illustrations of expanded and collapsed positions of a lasso-type catheter and displays presenting inter-electrode distances, in accordance with embodiments of the present invention.

FIG. 2 is a schematic, pictorial illustration of distal-end assembly 40 in an expanded position and TLIs 65 and 66 of display 46 presenting symbols indicative of inter-electrode distances, in accordance with an embodiment of the present invention.

In some embodiments, distal-end assembly 40 comprises a flexible arm 54, made from any suitable materials, such as a nickel-titanium alloy (e.g., nitinol) or any other suitable materials. Distal-end assembly 40 comprises multiple electrodes 55, 55A, 55B and 55C, which are coupled to arm 54 and are configured to apply to a target tissue of heart 26, ablation pulses received from a pulse generator (not shown) of console 24. The pulse generator can be either or both of an alternating radio-frequency (RF) generator or biphasic pulsed field generator for irreversible electroporation.

In some embodiments, electrodes 55, 55A, 55B and 55C are coupled at a predefined distance from one another, in the present example, the predefined distance is larger than about 3 mm.

In the context of the present disclosure and in the claims, the terms "about" or "approximately" for any numerical values or ranges indicate a suitable dimensional tolerance that allows the part or collection of components to function for its intended purpose as described herein.

Reference is now made to an inset 60, which is a section of display 46 shown in FIG. 1 above. In some embodiments, inset 60 comprises TLIs 65 and 66, each of which comprising symbols 67, 68 and 69, wherein symbol 67 may have a red or white color, symbol 68 may have an amber or white color, and symbol 69 may have a green or white color. Note that the color scheme described above is provided by way of example, and in other embodiments, at least one of TLIs 65 and 66 may comprise any other suitable type of one or more color schemes.

In some embodiments, processor 42 is configured to receive, e.g., from one or more position sensors 39, one or more position signals indicative of positions of respective electrodes of the catheter. In the present example, processor 42 receives position signals indicative of the positions of electrodes 55A, 55B and 55C.

In some embodiments, processor 42 is configured to calculate, based on the position signals, a distance 72 between electrodes 55A and 55B, and a distance 74 between electrodes 55A and 55C. While distance 72 or 74 is shown as the distance between the centerline of the electrodes, it is within the scope of the invention to measure the distance from other datum such as the sides of the electrodes or the edge of the electrodes. Processor 42 is configured to produce (i) a first indication, in response to finding that the calculated distance is larger than the aforementioned first threshold (3 mm), (ii) a second indication, in response to finding that the calculated distance is smaller than 3 mm and larger than the aforementioned second threshold (1 mm), and (iii) a third indication, in response to finding that the calculated distance is smaller than 1 mm.

Figure 3:
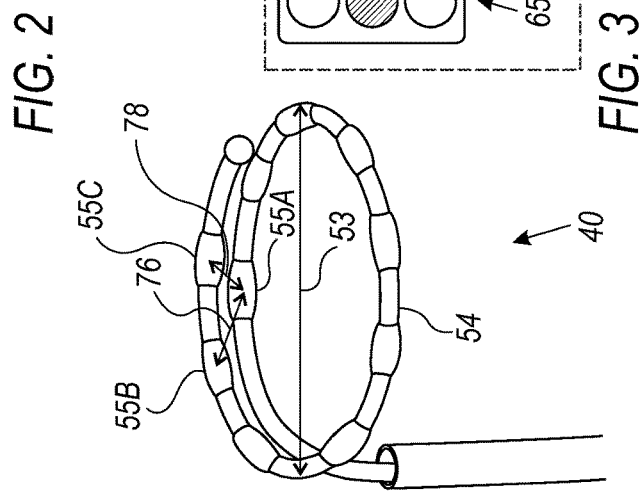

In the context of the present disclosure, the terms "distance" and "inter-electrode distance" are used interchangeably and refer to a mutual distance among any one or more selected pairs of electrodes of distal-end assembly 40, which may be calculated by processor 42 as described in detail in FIGS. 2 and 3 of the present disclosure. In other words, the terms "distance" and "inter-electrode distance" refer to the distance measured between corresponding reference points on any two selected electrodes 55 of distal-end assembly 40.

In some embodiments, when the measured distance is larger than the first threshold, the inter-electrode distance is in the desired range of distances. In other embodiments, when the measured distance is smaller than the second threshold, which may be indicative of the minimal distance allowed between adjacent electrodes 55, processor 42 may produce an alert to physician 30, to hold or suspend the applying of ablation pulse(s) to the target tissue of heart 26.

In some embodiments, TLI 65 is configured to present a symbol indicative of distance 72 between electrodes 55A and 55B and TLI 66 is configured to present a symbol indicative of distance 74 between electrodes 55A and 55C. In such embodiments, TLIs 65 and 66 are configured to present (i) symbol 69 in response to receiving the first indication, (ii) symbol 68, in response to receiving the second indication, and (iii) symbol 67, in response to receiving the third indication. In other words, (i) when the inter-electrode distance is smaller than 1 mm, the respective TLI presents symbol 67 in a red color and symbols 68 and 69 in a white color, (ii) when the inter-electrode distance is between 1 mm and 3 mm, the respective TLI presents symbol 68 in an amber color, and symbols 67 and 69 in a white color, and (iii) when the inter-electrode distance is larger than 3 mm, the respective TLI presents symbol 69 in a green color and symbols 67 and 68 in a white color.

In the example of FIG. 2, both distance 72 and 74 are larger than 3 mm, so that processor 42 produces and sends the first indication to TLIs 65 and 66, respectively. In response to receiving the first indication, both TLIs 65 and 66 present symbol 69 in a green color and symbols 67 and 68 in a white color.

In the example of FIG. 2, the inter-electrode distance is sufficiently large so that ablation pulses may not undesirably be transferred or shared between electrodes 55A and 55B, or between electrodes 55A and 55C. In some embodiments, before applying the ablation pulses to one or more of electrodes 55A, 55B and 55C, physician 30 may take a brief look at display 46 and see that the inter-electrode is sufficiently large for applying the ablation pulses to the respective electrodes.

Additionally or alternatively, processor 42 is configured to receive, from one or more pairs of selected electrodes (e.g., electrodes 55A and 55B, and electrodes 55A and 55C), one or more signals (also referred to herein as impedance signals) indicative of the impedance measured between each pair of the electrodes of the catheter. In the present example, processor 42 receives signals indicative of: (i) a first impedance measured between electrodes 55A and 55B, and (ii) a second impedance measured between electrodes 55A and 55C.

In some embodiments, processor 42 is configured to calculate, based on the first and second impedance signals, distance 72 between electrodes 55A and 55B, and distance 74 between electrodes 55A and 55C. Moreover, processor 42 is configured to hold first and second impedance thresholds indicative of the first and second thresholds of distance that are described above. In the present example, the first impedance threshold is indicative of an inter-electrode distance of about 3 mm, and the second impedance threshold is indicative of an inter-electrode distance of about 1 mm. In such embodiments, processor 42 is configured to produce (i) a first indication, in response to finding that the measured threshold is larger than the first impedance threshold (i.e., the inter-electrode distance is larger than about 3 mm), (ii) a second indication, in response to finding that the measured threshold is smaller than the first impedance threshold and larger than the second impedance threshold (i.e., indicative of a distance smaller about 3 mm and larger than about 1 mm), and (iii) a third indication, in response to finding that the measured threshold is smaller than the second impedance threshold (i.e., indicative of an inter-electrode distance smaller than about 1 mm).

In the example of FIG. 2, both impedance signals are larger than the first impedance threshold, and therefore, both TLIs 65 and 66 present symbol 69 in a green color and symbols 67 and 68 in a white color.

FIG. 3 is a schematic, pictorial illustration of distal-end assembly 40 in a collapsed position and TLIs 65 and 66 of display 46 presenting symbols indicative of inter-electrode distances, in accordance with an embodiment of the present invention.

In the example of FIG. 3, physician 30 may use distal-end assembly 40 for ablating, in a pulmonary vein (PV) isolation procedure, ostium of a PV (not shown) of heart 26, having an inner diameter, e.g., between about 15 mm and 32 mm, or any other diameter.

In some embodiments, during the PV isolation procedure, physician 30 applies manipulator 32 for obtaining a suitable outer diameter 53 to the shape of distal-end assembly 40. In the present example, physician 30 may arrange distal-end assembly 40 to have outer diameter 53 of about 11 mm. In this configuration, physician 30 can fit distal-end assembly 40 into the inner diameter of the aforementioned PV, and place at least electrodes 55A, 55B and 55C (and typically also electrodes 55) in contact with the inner perimeter of the PV.

In the example of FIG. 3, electrodes 55A and 55B are positioned at a distance 76, e.g., about 2 mm, from one another, and electrodes 55A and 55C are positioned at a distance 78, e.g., about 0.5 mm, from one another.

In some embodiments, processor 42 calculates distances 76 and 78 using the techniques described in FIG. 2 above, or any other suitable techniques. Based on the calculation of distance 76, processor 42 produces the second indication, and based on the calculation of distance 78, processor 42 produces the third indication.

Reference is now made to inset 61 of FIG. 3, which is the aforementioned section of display 46. In some embodiments, in response to receiving the second indication from processor 42, TLI 65 is configured to present symbol 68 in an amber color, and symbols 67 and 69 in a white color. Similarly, in response to receiving the third indication from processor 42, TLI 66 is configured to present symbol 67 in a red color, and symbols 68 and 69 in a white color.

In some embodiments, based on the colors presented in TLIs 65 and 66 of FIG. 3, physician 30 may not apply the ablation pulses to any of electrodes 55A, 55B and 55C. Moreover, even if one of TLIs 65 and 66 presents a red color or an amber color, physician 30 may use manipulator 30 for adjusting the arrangement of distal-end assembly 40, until green color is obtained in symbol 69 of both TLIs 65 and 66. After obtaining the green color in both TLIs 65 and 66, physician 30 may control system 20 to apply the ablation pulses to the target tissue of heart 26.

In some embodiments, TLIs 65 and 66 provide physician 30 with a fast and clear indication of whether it is safe to apply the ablation pulses, via one or more of electrodes 55A, 55B and 55C, to the target tissue of heart 26. In other embodiments, the techniques described above may be applied, mutatis mutandis, to any selected pair of electrodes from among the electrodes of distal-end assembly 40.

In other embodiments, instead of having multiple TLIs, display 46 is configured to have any other suitable display for presenting indications of the inter-electrode distances. For example, display 46 may have a matrix of all the electrodes intended to receive the ablation pulses arranged in a column and a row, and may display, for each pair of electrodes, the aforementioned red or amber or green color.

In alternative embodiments, processor 42 is configured to receive, from one or more pairs of electrodes (e.g., between electrodes 55A and 55B, and between electrodes 55A and 55C), the aforementioned first and second impedance signals indicative of the impedance measured between each pair of the electrodes of the catheter. In the present example, processor 42 receives impedance signals indicative of: (i) a first impedance measured between electrodes 55A and 55B, and (ii) a second impedance measured between electrodes 55A and 55C.

In some embodiments, processor 42 is configured to calculate, based on the first and second impedance signals, distance 76 between electrodes 55A and 55B, and distance 78 between electrodes 55A and 55C. As described above, processor 42 is configured to hold the first and second impedance thresholds indicative, respectively, of about 3 mm and about 1 mm inter-electrode distances. As described in FIG. 2 above, processor 42 is configured to produce the first, second and third indications, in response to finding that the measured threshold is: (i) larger than the first impedance threshold, (ii) smaller than the first impedance threshold and larger than the second impedance threshold, and (iii) smaller than the second impedance threshold, respectively.

In the example of FIG. 3, (i) the impedance signal measured between electrodes 55A and 55B is smaller than the first impedance threshold and larger than the second impedance threshold, and (ii) the impedance signal measured between electrodes 55A and 55C is smaller than the second impedance threshold. Based on the measured impedances and the impedance thresholds, processor 42 is configured to estimate that: electrodes 55A and 55B are positioned at distance 76, e.g., about 2 mm, from one another, and therefore, to produce the second indication, and (ii) electrodes 55A and 55C are positioned at distance 78, e.g., about 0.5 mm, from one another, and therefore, to produce the third indication.

In such embodiments, in response to receiving the second indication from processor 42, TLI 65 is configured to present symbol 68 in an amber color, and symbols 67 and 69 in a white color. Similarly, in response to receiving the third indication from processor 42, TLI 66 is configured to present symbol 67 in a red color, and symbols 68 and 69 in a white color.

Figure 4:
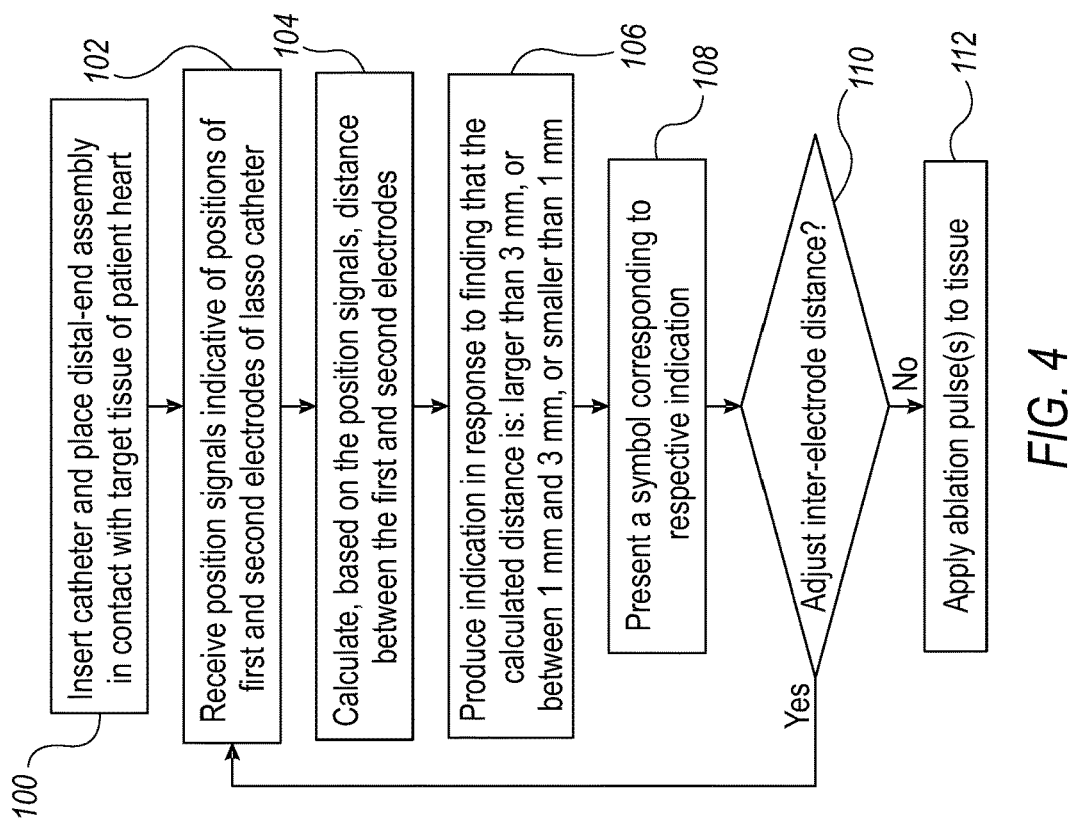
FIG. 4 is a flow chart that schematically illustrates a method for performing a ablation procedure, in accordance with an embodiment of the present invention.

Performing Ablation Procedure Using Graphically Presented Symbols Indicative of Inter-Electrode Distances FIG. 4 is a flow chart that schematically illustrates a method for performing an ablation procedure using graphically presented symbols 67, 68 and 69 of TLIs 65 and 66, in accordance with an embodiment of the present invention.

The method begins at a catheter insertion step 100, with inserting distal-end assembly 40 of lasso-shaped catheter 22 and placing distal-end assembly 40 in contact with target tissue of heart 26. At a position signals receiving step 102, processor 42 receives position signals indicative of respective positions of at least electrodes 55A, 55B and 55C of catheter 22, as described in FIGS. 1-3 above.

At a distance calculation step 104, processor 42 calculates, based on the received position signals, distances, such as distances 72 and 76, between electrodes 55A and 55B, as described in FIGS. 2 and 3 above. At an indication production step 106, processor 42 produces first, second and third indications in response to finding that the calculated distance is: larger than 3 mm, between 1 mm and 3 mm, and smaller than 1 mm, respectively. In other words, when the inter-electrode distance is smaller than the first threshold (e.g., approximately 3 mm), physician 30 has to carefully consider whether the arrangement of electrodes 55 is suitable for applying ablation. When inter-electrode distance is smaller than the second threshold (e.g., approximately 1 mm), physician 30 has to adjust the inter-electrode distance before applying the ablation pulses to the tissue of heart 26.

At a symbol presenting step 108, display 46 presents, e.g., on TLIs 65 and 66, symbols 67, 68 and 69, corresponding to the first, second and third indications, as described in FIGS. 2 and 3 above.

At a decision step 110, physician 30 looks at TLIs 65 and 66 presented on display 46, and based on symbols 67, 68 and 69, physician 30 decides whether or not to adjust the inter-electrode distance. In some embodiments, as shown in the example of FIG. 2 above, both TLIs 65 and 66 present symbol 69 in a green color and symbols 67 and 68 in a white color, in this example, the method proceeds to a tissue ablating step 112, in which processor 42 controls the pulse generator to apply one or more ablation pulse(s) to one or more electrodes 55A, 55B and 55C. Note that step 112 concludes the method and after concluding step 112, physician 30 extracts distal-end assembly 40 out of patient heart 26.

In other embodiments, in which at least one of TLIs 65 and 66 presents a red color or an amber color, e.g., as shown in both TLIs 65 and 66 of FIG. 3 above. In such embodiments, physician 30 adjusts the inter-electrode distance, e.g., using manipulator 32, and the method loops back to step 102 for receiving position signals of the adjusted positions of electrodes 55A, 55B and 55C, and subsequently, recalculating the inter-electrode distances and representing indications thereof, as described in steps 104-108 above.

Additionally or alternatively to decision step 110, processor 42 is configured, based on the calculated distances and produced indications, to display on display 46, a warning or an alert, such as a pop-up graphical or text message, indicative of whether or not physician 30 can apply the one or more ablation pulse(s) as described in step 112 above, or whether physician 30 has to adjust the inter-electrode distance between a respective pair from among the electrodes of distal-end assembly 40, as described above in the method loop back.

In other embodiments, when the calculated distance between any pair of electrodes from among electrodes 55A, 55B and 55C, is smaller than the second threshold, processor 42 is configured to disable the application of ablation pulse(s) to the target tissue and display an alert. In such embodiment, processor 42 prevents physician 30 from applying ablation pulse(s) unintentionally (e.g., by mistake). However, physician 30 may still override the message and control system 20 to apply the ablation pulse(s) to the target tissue.

In alternative embodiments, steps 102 and 104 may be replaced with receiving impedance signals measured between a pair of electrodes (e.g., impedance measured between electrodes 55A and 55B), wherein the measured impedance is indicative of the distance between electrodes 55A and 55B. Moreover, instead of holding the first and second distance threshold, processor 42 may hold first and second impedance threshold that, in the present example, are indicative of distances of about 3 mm and about 1 mm between electrodes 55A and 55B. In such embodiments, at step 106, processor 42 may produce the indication(s) by comparing between the measured impedance and the impedance thresholds, and the operations carried out at steps 108, 110 and 112 remain as described above.

Although the embodiments described herein mainly address cardiac ablation using a lasso-type catheter, the methods and systems described herein can also be used in other applications, such as in any sort of ablation applied to any suitable tissue, using any sort of flexible catheter having multiple electrodes. Moreover, the methods and systems described herein can also be used in any suitable electrosurgical procedures using flexible instruments with multiple electrodes.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for electrophysiology applications, the system comprising:
    a catheter configured for insertion into a patient organ, the catheter including a distal end assembly comprising a flexible arm having an arcuate structure disposed generally orthogonally with respect to a longitudinal axis of the catheter, the flexible arm configured to curve circumferentially around the longitudinal axis and transition between a first configuration and a second configuration, the first configuration defining a first diameter and the second configuration defining a second diameter, the second diameter being greater than the first diameter, the flexible arm further comprising at least a first electrode and a second electrode disposed thereon, the first electrode and the second electrode configured to apply ablation pulses to tissue in the patient organ;
    a plurality of magnetic-based position sensors, at least one magnetic-based position sensor of the plurality of magnetic-based position sensors being disposed on the flexible arm between at least the first electrode and the second electrode;
    a processor, which is configured to:
        receive position data from the plurality of magnetic-based position sensors;
        determine, based at least in part on the position data, (i) a first position of the first electrode on the flexible arm and (ii) a second position of the second electrode on the flexible arm;
        calculate, based on the first position of the first electrode and the second position of the second electrode when the flexible arm is in the first configuration, the second configuration, or a configuration therebetween, a distance between the first and second electrodes; and
        produce: (i) a first indication in response to determining that the calculated distance between the first electrode and the second electrode is greater than a first threshold distance, (ii) a second indication in response to determining that the calculated distance between the first electrode and the second electrode is less than the first threshold distance and greater than a second threshold distance, the first threshold distance being greater than the second threshold distance, and (iii) a third indication in response to determining that the calculated distance between the first electrode and the second electrode is less than the second threshold distance;
    prevent, in response to determining that the calculated distance between the first electrode and the second electrode is less than the second threshold distance, the first electrode and the second electrode from applying the one or more ablation pulses to the tissue in the patient organ; and
    a display, which is configured to present: (i) a first symbol, in response to receiving the first indication, (ii) a second symbol, in response to receiving the second indication, and (iii) a third symbol, in response to receiving the third indication.

2. The system according to claim 1, wherein the display is configured to graphically present a traffic light, and wherein (i) the first symbol comprises a first color displayed at a first location of the traffic light, (ii) the second symbol comprises a second color displayed at a second location of the traffic light, and (iii) the third symbol comprises a third color displayed at a third location of the traffic light.

3. The system according to claim 1, wherein the patient organ comprises a heart of the patient and the catheter comprises a lasso-type catheter.

4. The system according to claim 3, wherein when the calculated distance between the first and second electrodes is less than the first threshold distance, the processor is configured to produce a message indicative of whether a user can apply the one or more ablation pulses to the tissue.

5. A method, comprising:
    receiving position data from a plurality of magnetic-based position sensors, at least one magnetic-based position sensor of the plurality of magnetic-based position sensors being disposed between at least a first electrode and a second electrode positioned on a flexible arm of a catheter inserted into an organ of a patient, the flexible arm having an arcuate structure disposed generally orthogonally with respect to a longitudinal axis of the catheter, the flexible arm configured to curve circumferentially around the longitudinal axis and transition between a first configuration and a second configuration, the first configuration defining a first diameter and the second configuration defining a second diameter, the second diameter being greater than the first diameter;
    determine, based at least in part on the position data, (i) a first position of the first electrode on the flexible arm and (ii) a second position of the second electrode on the flexible arm, the first electrode and the second electrode configured to apply ablation pulses to tissue in the patient organ;
    calculating, based on the first position of the first electrode and the second position of the second electrode when the flexible arm is in the first configuration, the second configuration, or a configuration therebetween, a distance between the first and second electrodes;
    producing: (i) a first indication in response to determining that the calculated distance between the first electrode and the second electrode is greater than a first threshold distance, (ii) a second indication in response to determining that the calculated distance between the first electrode and the second electrode is less than the first threshold distance and greater than a second threshold distance, the first threshold distance being greater than the second threshold distance, and (iii) a third indication in response to determining that the calculated distance between the first electrode and the second electrode is less than the second threshold distance;

preventing, in response to determining that the calculated distance between the first electrode and the second electrode is less than the second threshold distance, a user from applying the ablation pulses to the tissue; and presenting: (i) a first symbol, in response to receiving the first indication, (ii) a second symbol, in response to receiving the second indication, and (iii) a third symbol, in response to receiving the third indication.

6. The method according to claim 5, wherein presenting the first, second and third symbols comprises graphically presenting a traffic light, and wherein (i) the first symbol comprises a first color displayed at a first location of the traffic light, (ii) the second symbol comprises a second color displayed at a second location of the traffic light, and (iii) the third symbol comprises a third color displayed at a third location of the traffic light.

7. The method according to claim 5, wherein the organ comprises a heart of the patient and the catheter comprises a lasso-type catheter.

8. The method according to claim 7, and comprising, when the calculated distance between the first and second electrodes is less than the first threshold distance, producing a message indicative of whether a user can apply the one or more ablation pulses to the tissue.

9. A system, comprising:

a processor, which is configured to:

receive one or more impedance signals indicative of an impedance measured between at least first and second electrodes coupled to a flexible arm of a catheter inserted into an organ of a patient, the flexible arm having an arcuate structure disposed generally orthogonally with respect to a longitudinal axis of the catheter, the flexible arm configured to curve circumferentially around the longitudinal axis and transition between a first configuration and a second configuration, the first configuration defining a first diameter and the second configuration defining a second diameter, the second diameter being greater than the first diameter, each impedance measurement indicative of an estimated distance between respective electrodes of the at least first and second electrodes;

in response to determining that the impedance is greater than a first threshold impedance indicative of a first distance between the first and second electrodes, output a first indication corresponding to the first distance between the first and second electrodes being greater than a first threshold distance;

in response to determining that the impedance is less than the first threshold impedance and greater than a second threshold impedance indicative of a second distance between the first and second electrodes, output a second indication corresponding to the second distance between the first and second electrodes being less than the first threshold distance and greater than a second threshold distance; and in response to determining that the impedance is less than the second threshold impedance, output a third indication corresponding to a third distance between the first and second electrodes being less than the second threshold distance; and a display, which is configured to present: (i) a first symbol, in response to receiving the first indication, (ii) a second symbol, in response to receiving the second indication, and (iii) a third symbol, in response to receiving the third indication.

10. The system according to claim 9, wherein the display is configured to graphically present a traffic light, and wherein (i) the first symbol comprises a first color displayed at a first location of the traffic light, (ii) the second symbol comprises a second color displayed at a second location of the traffic light, and (iii) the third symbol comprises a third color displayed at a third location of the traffic light.

11. The system according to claim 9, wherein the organ comprises a heart of the patient and the catheter comprises a lasso-type catheter, and wherein the first and second electrodes comprise ablation electrodes configured to apply one or more ablation pulses to tissue of the heart.

12. The system according to claim 11, wherein when the measured impedance between the first and second electrodes is less than the first threshold impedance, the processor is configured to produce a message indicative of whether a user can apply the one or more ablation pulses to the tissue.

13. The system according to claim 11, wherein when the measured impedance between the first and second electrodes is less than the second threshold impedance, the processor is configured to prevent a user from applying the one or more ablation pulses to the tissue.

* * * * *